United States Patent
Patil et al.

(10) Patent No.: US 10,742,612 B2
(45) Date of Patent: Aug. 11, 2020

(54) DETERMINE PAYLOAD INTEGRITY FOR TRAFFIC FLOWING ACROSS PROXIES

(71) Applicant: Cisco Technology, Inc., San Jose, CA (US)

(72) Inventors: Prashanth Patil, San Jose, CA (US); K. Tirumaleswar Reddy, Karnataka (IN); Justin James Muller, San Jose, CA (US); Judith Ying Priest, Palo Alto, CA (US); Puneeth Rao Lokapalli, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 15/784,708

(22) Filed: Oct. 16, 2017

(65) Prior Publication Data
US 2019/0116158 A1  Apr. 18, 2019

(51) Int. Cl.
*H04L 29/06* (2006.01)
*H04L 9/32* (2006.01)
(Continued)

(52) U.S. Cl.
CPC ........ *H04L 63/0281* (2013.01); *H04L 9/3239* (2013.01); *H04L 9/3297* (2013.01);
(Continued)

(58) Field of Classification Search
CPC . H04L 63/0821; H04L 69/22; H04L 63/0236; H04L 63/123; H04L 63/1466;
(Continued)

(56) References Cited

U.S. PATENT DOCUMENTS

| 7,853,795 B2 * | 12/2010 | Dick ................ H04L 63/0428 380/229 |
| 7,936,682 B2 * | 5/2011 | Singh .................... H04L 69/22 370/241 |

(Continued)

FOREIGN PATENT DOCUMENTS

GB    2541950 A  *  3/2017  ............ H04W 4/70

OTHER PUBLICATIONS

Yulia Horbenko. "Using Blockchain Technology to Boost Cybersecurity" Published Aug. 14, 2017 (8 pages) http://web.archive.org/web/20170904144505/https://steelkiwi.com/blog/using-blockchain-technology-to-boost-cybersecurity/ (Year: 2017).*

(Continued)

*Primary Examiner* — Joseph P Hirl
*Assistant Examiner* — Thomas A Gyorfi
(74) *Attorney, Agent, or Firm* — Edell, Shapiro & Finnan, LLC

(57) ABSTRACT

In a network that includes a client, a server and one or more proxy entities that intercept network traffic between the client and the server, a computer-implemented method is provided including: establishing trust with a permissioned distributed database; computing hashes from packet payloads of network traffic originated, intercepted or received; storing the hashes to the permissioned distributed database so that the permissioned distributed database maintains hashes computed from packets of the network traffic originated, intercepted or received by the client, server and the one or more proxy entities; and validating the hashes by comparing, with each other, the hashes stored to the permissioned distributed database by the client, server and the one or more proxy entities to determine whether any packet payload of the network traffic was modified in transit.

20 Claims, 5 Drawing Sheets

(51) Int. Cl.
*H04L 12/24* (2006.01)
*H04L 12/26* (2006.01)

(52) U.S. Cl.
CPC .......... *H04L 41/042* (2013.01); *H04L 43/026* (2013.01); *H04L 63/123* (2013.01); *H04L 69/22* (2013.01); *H04L 63/0236* (2013.01); *H04L 63/1466* (2013.01); *H04L 2209/38* (2013.01)

(58) Field of Classification Search
CPC . H04L 2209/38; H04L 9/3297; H04L 9/3239; G06F 21/60
See application file for complete search history.

(56) References Cited

U.S. PATENT DOCUMENTS

| | | | |
|---|---|---|---|
| 8,139,588 | B2 | 3/2012 | Hardjono et al. |
| 2005/0041955 | A1* | 2/2005 | Beuque ................ H04L 9/3236 386/248 |
| 2007/0214505 | A1 | 9/2007 | Stavrou et al. |
| 2012/0174196 | A1 | 7/2012 | Bhogavilli et al. |
| 2013/0329584 | A1* | 12/2013 | Ghose .................. H04L 45/586 370/252 |
| 2014/0280442 | A1* | 9/2014 | Jiang .................. H04L 67/1097 709/201 |
| 2017/0031874 | A1* | 2/2017 | Boudville ........... G06F 16/9024 |
| 2017/0134937 | A1* | 5/2017 | Miller ................ G06Q 20/3829 |
| 2017/0171362 | A1* | 6/2017 | Bolotov .................. H04L 69/22 |
| 2017/0366395 | A1* | 12/2017 | Goldfarb ............ H04L 12/4633 |
| 2018/0248880 | A1* | 8/2018 | Sardesai ............... H04L 63/101 |
| 2018/0285839 | A1* | 10/2018 | Yang .................. G06Q 20/0655 |
| 2018/0341930 | A1* | 11/2018 | Moir .................. G06Q 20/0655 |
| 2018/0359269 | A1* | 12/2018 | Caceres .............. H04L 63/1425 |

OTHER PUBLICATIONS

Li, et al., "LIVE: Lightweight Integrity Verification and Content Access Control for Named Data Networking," IEEE Transactions on Information Forensics and Security, vol. 10, No. 2, Feb. 2015, 13 pages.
Cisco, "Cisco Integrity Verification Application (Beta) on APIC-EM User Guide, Release 1.5.0.266," Aug. 1, 2017, 51 pages.
Bertino, et al., "High-Assurance Integrity Techniques for Databases," BNCOD '08, Proceedings of the 25th British National Conference on Databases: Sharing Data, Information and Knowledge, Jul. 2008, 13 pages.
McGrew, et al., "TLS Proxy Server Extension," IETF, TLS Internet Draft, Jul. 16, 2012, 18 pages.
Akamai, "Cloud Security," retrieved from https:www.akamai.com/us/en/cloud-security.jsp, on Apr. 18, 2016, 9 pages.
Barnes, "DANE: Taking TLS Authentication to the Next Level Using DNSSEC," IETF Journal, Oct. 2011, 8 pages.
Barnes, et al., Automatic Certificate Management Environment (ACME), IETF, Network Working Group, Internet Draft, Jul. 21, 2015, 57 pages.
Barnes, et al., Automatic Certificate Management Environment (ACME), IETF, Network Working Group, Internet Draft, Mar. 21, 2016, 55 pages.
Mortensen, et al., "Distributed Denial of Service (DDoS) Open Threat Signaling Requirements," IETF, DOTS Internet Draft, Mar. 18, 2016, 16 pages.
Dobbins, et al. "Use Cases for DDoS Open Threat Signaling," IETF, DOTS WG Internet Draft, Mar. 21, 2016, 22 pages.
Quinn, et al., "Network Service Header," IETF, Network Working Group, Internet Draft, Jul. 23, 2015, 43 pages.
Migault, "DDoS Open Threat Signaling Use Cases," IETF, DOTS Internet Draft, Apr. 20, 2015, 14 pages.
Sullivan, "Keyless SSL: The Nitty Gritty Technical Details," Sep. 19, 2014, retrieved from https://blog.cloudfare.com/keyless-ssl-the-nitty-gritty-technical-details/, 14 pages.
PRWEB, "Prolexic Unveils New DDoS Mitigation Service at the 2012 RSA Conference,"retrieved from http://www.prweb.com/releases/2012/2/prweb9213291.htm, on Apr. 18, 2016, 3 pages.
Mortensen, et al., "Distributed-Denial-of-Service Open Threat Signaling (DOTS) Architecture," IETF, DOTS Interne Draft, Oct. 31, 2016, 29 pages.

* cited by examiner

DETERMINE PAYLOAD INTEGRITY FOR TRAFFIC FLOWING ACROSS PROXIES

TECHNICAL FIELD

The present disclosure relates to network communication.

BACKGROUND

Cloud-based security services (and on premise middle boxes acting as Transport Layer Security (TLS) proxies) are largely based on being able to intercept or proxy flows so as to subject flows to security inspection. These services range from web security services, firewalls, malware detection to services such as data loss prevention (DLP), distributed denial of service (DDoS) mitigation, etc. This is also relevant in situations in which cloud services rely on service function chaining i.e. a service function classifier channels flows across proxy services, especially for service functions that span across service function chain domains (different administrative domains).

In case of a DDoS attack, traffic is temporarily steered to a DDoS mitigation provider during a DDoS attack until the attack is mitigated. Content providers manually upload public certificates and private keys to the DDoS mitigation provider to block attacks at Layer 7 or the TLS layer for secure servers. The is especially complicated with DDoS Open Threat Signaling (DOTS), where DDoS mitigation is dynamically delegated to an alternate DDoS mitigation provider and the private keys are conveyed to the alternate DDoS mitigation provider. In all of these cases, the solutions are dependent on the fact that payload needs to be inspected either for security, monitoring or classification.

A concern with such solutions is that these services, acting as man-in-the-middle (MITM) entities, may modify or compromise payload, especially when traffic flows through multiple proxies. This concern is across clients (end-users), proxies and servers (content providers).

DESCRIPTION OF EXAMPLE EMBODIMENTS

Overview

Figure 1:
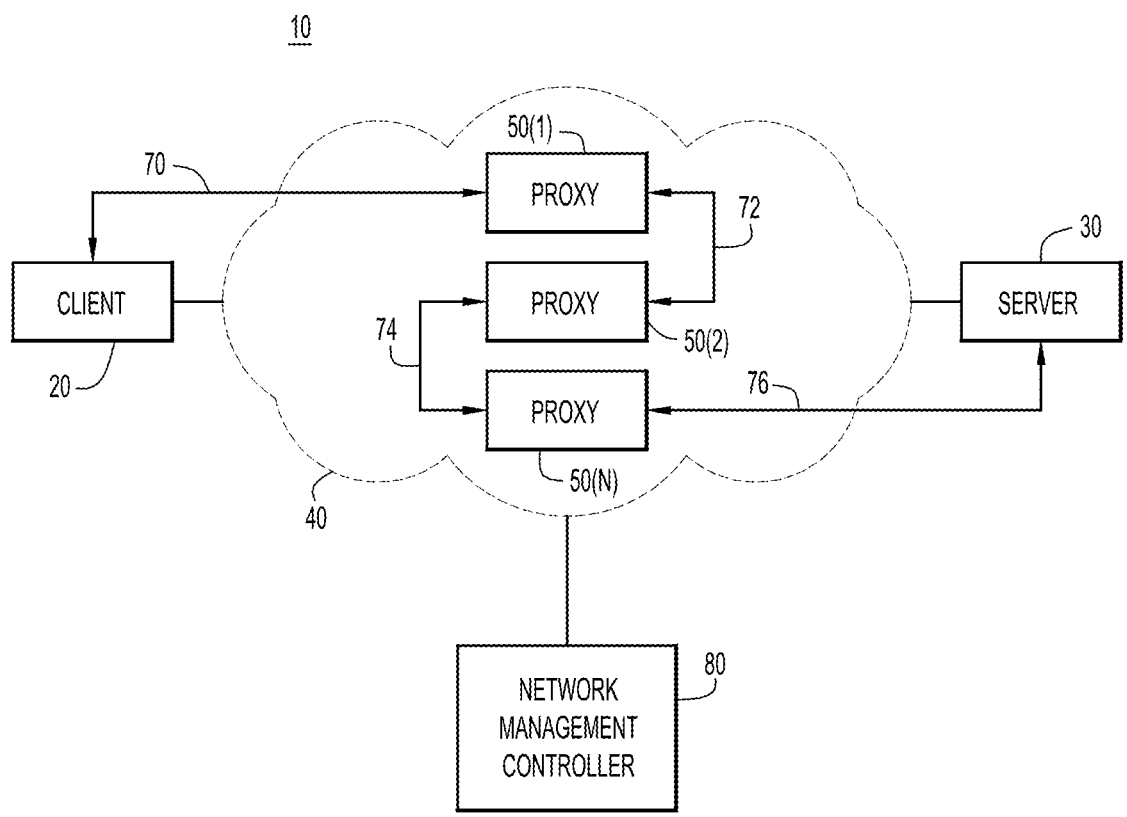
FIG. 1 is a block diagram of a network environment in which the payload integrity validation techniques described herein may be employed, according to an example embodiment.

In a network that includes a client, a server and one or more proxy entities that intercept network traffic between the client and the server, a computer-implemented method is provided to validate the integrity of network traffic payload. The client, server and the one or more proxy entities to participate in the integrity validation techniques establish trust with a permissioned distributed database. Each of the client, server and one or more proxy entities compute hashes from packet payloads of originated, intercepted or received network traffic, and store the hashes to the permissioned distributed database so that the permissioned distributed database. The permissioned distributed database maintains hashes computed from packets of the network traffic originated, intercepted or received by the client, server and the one or more proxy entities. The client, server, one or more proxy entities or any validation service can validate the hashes by comparing, with each other, the hashes stored to the permissioned distributed database by the client, server and the one or more proxy entities to determine whether any packet payload of the network traffic was modified in transit.

Example Embodiments

Presented herein are techniques for a client and a server to determine if network traffic payload is being compromised in such a proxied transit. This solution offers the client and the server an option to selectively determine the payload integrity for certain interesting flows (e.g. financial transactions, during DDoS mitigation, critical flows that need security and immutable data, etc.).

These techniques determine payload integrity for packets flowing across proxies in a network or other communication environment. A client and a server (or any other network device there between—for purposes of steering or packet inspection) determine that traffic flowing between them has not been tampered with. In one form, all entities in the path of the traffic are configured to determine if something has changed in the payload of the network traffic. If one of the entities determines that the network traffic has been determined to have changed, then the traffic can be discarded and/or an alarm/notification can be generated to indicate that network traffic payload has changed.

The client or server determines which flows between them are to be monitored for integrity and indicates to every entity in transit to ensure that nothing has been changed. The client computes a hash of the payload and stores the hash into a permissioned distributed database. A comparison is made of all the hashes to ensure that what the client sent is what the server received, and what the server sent is what the client received. If something changed between the client and the server, then it is known that some entity tampered with the payload, and it can determined which entity did that tampering based on the data stored to the permissioned distributed database by the various entities in the transit path. Verification/audit of the integrity may be done by the client, the server, or both the client and the server, or any other entity with a desire/need-to-know about the integrity of the payload of network traffic.

A permissioned distributed database is used for short-lived storage of hash computations related to the payload of the network traffic. Identity is proven to the permissioned distributed database by each participating entity/device. Nothing is changed to the packets themselves by this process. The hash computations may be computed at an aggregate level for a period of time, for certain number of packets for certain transaction, etc. A hash is built over that aggregate level to prove that nothing has been tampered within the network traffic payload.

In one form, a blockchain is used as the permissioned distributed database. Blockchain is a distributed ledger mechanism that allows multiple entities to add to the distributed ledger. A client, a server and any other entity in the path joins a "blockchain network" to participate in this mechanism. However, while certain examples are described herein that use blockchain technology, the techniques presented herein are not limited to the use of blockchain. There are other crypto technologies to do similar functions and create trust in a way that would be applicable to the techniques presented herein.

Referring now to FIG. 1, a diagram is shown of a system 10 that includes, in a simplified form, a client 20, a server 30 and a network 40 that includes one or more intervening entities (proxies) 50(1)-50(N). The proxies 50(1)-50(N) may be any element that is in the path of network traffic between the client 20 and the server 30 that intercepts the traffic and has access to the network traffic payload to perform various functions, as described above. Network traffic between the client 20 and the server 30 is depicted at reference numerals 70, 72, 74, and 76, which reflect individual TLS sessions, only by way of example. In one example use case, the client 20 is a banking customer and the server is one of a cluster of servers that provides online banking services for the banking customer. Another example use case is where the server is part of a content provider and the client is a subscriber to the content provider. Still another use case is where the client, server and proxies are part of an enterprise network (network 40) and the integrity of the network traffic is to be monitored to detect any indications of data compromise. FIG. 1 shows, as an example, a network management controller 80 that may, in one embodiment, initiate an audit session.

The techniques presented herein enable the auditing of the payload of network traffic in transit between two endpoints of interest, e.g., the client 20 and server 30, to detect whether there is any tampering with the content of the payload in transit, and moreover, if tampering is detected, to identify where in the transit path the tampering occurring so as to identify the network element that did the tampering. The client 20, server 30 and the proxies 50(1)-50(N) may be embodied by standalone physical devices or by software running on a computing device, e.g., in a cloud computing or datacenter network environment.

Figure 2A:
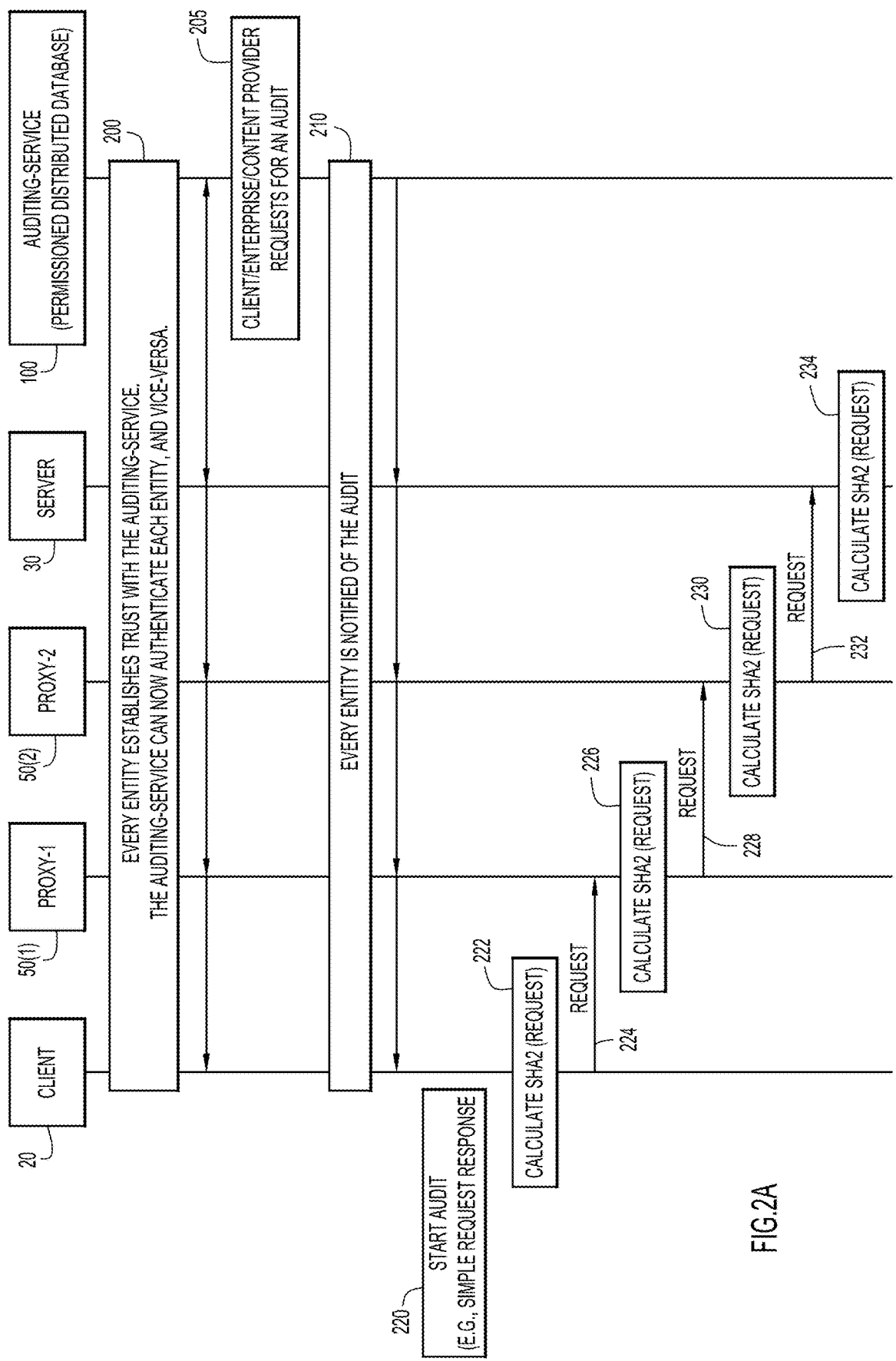
FIGS. 2A and 2B represent a sequence diagram depicting an operational flow of the payload integrity validation techniques, according to an example embodiment.
Figure 2B:
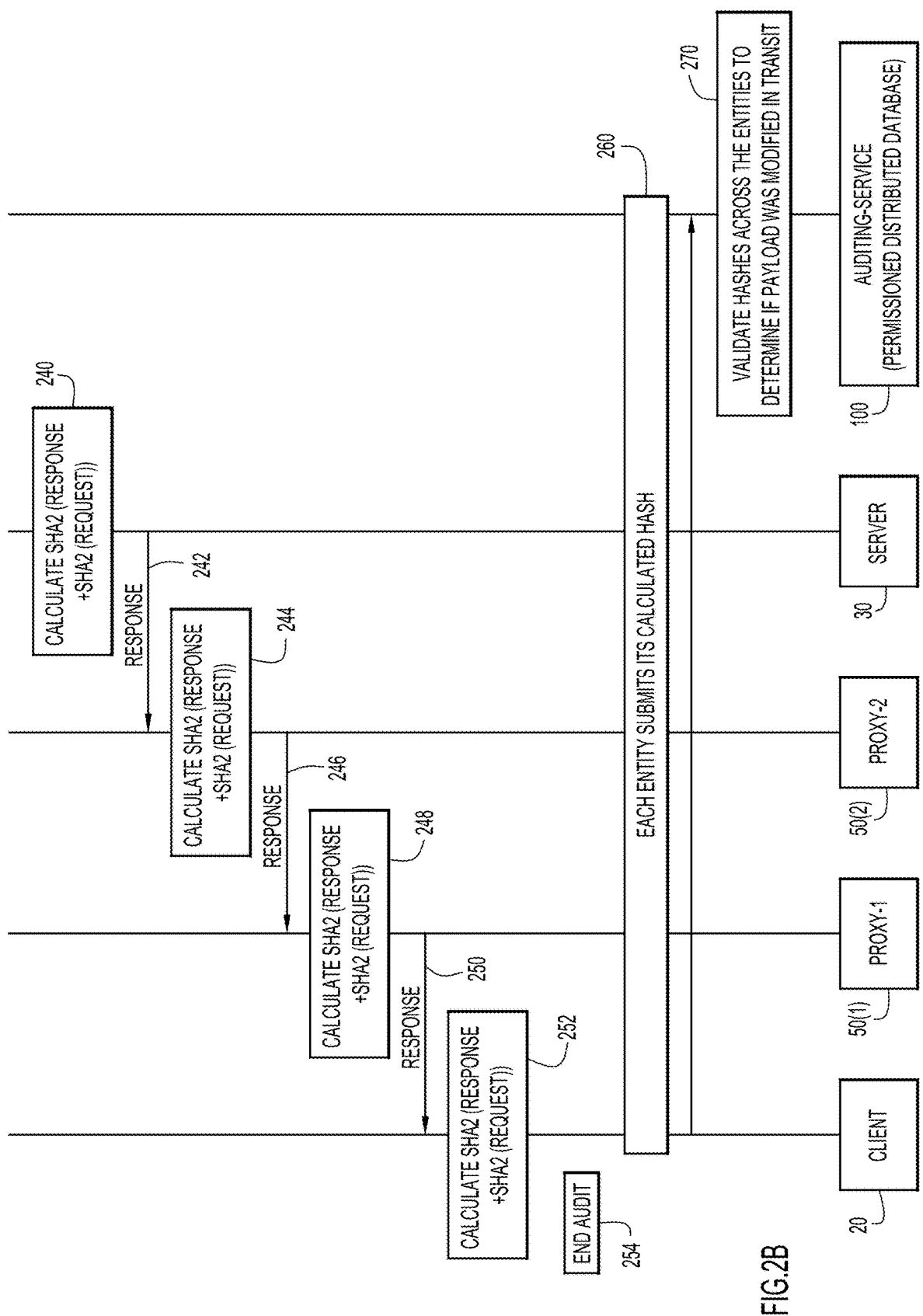

Reference is now made to FIGS. 2A and 2B, which are sequence diagrams illustrating an operation flow according to an example embodiment. Reference is also made to FIG. 1 for purposes of the description of FIGS. 2A and 2B. In the example depicted in FIGS. 2A and 2B, there is a client 20, server 30, a first proxy (Proxy-1) 50(1) and a second proxy (Proxy-2) 50(2). FIGS. 2A and 2B also show an auditing service 100 which may take the form of a permissioned distributed database. While the auditing service 100 is shown as a separate entity, in reality it may be embodied by functionality residing on each of the entities that participate in a distributed auditing function of network traffic that transits them, such as the client 20, proxy 50(1), proxy 50(2) and server 30. One example of such a permissioned distributed database is a blockchain, and to this end, further details are presented below of an example implementation using blockchain technology.

During an initial phase shown at 200, every entity establishes trust with the auditing service 100. When trust is established, the auditing service 100 may authenticate each entity and each entity can authenticate the auditing service 100.

At 205, an entity requests that an audit be made of the integrity of network traffic. Any entity may initiate the request. For example, the request may be initiated by the client 20, a network management function (e.g., network management controller 80 shown in FIG. 1) of an enterprise network, a content provider that operates the server 30, etc.

At 210, in one optional example, every entity to be involved in the audit is notified of the audit, or the entities in the system hash all the traffic and an audit can be done any time, as needed. That is, all nodes by default compute a hash and all nodes can be configured by their administrators to selectively hash select flows, or a central orchestrator (e.g., network management controller 80 shown in FIG. 1) can dynamically instruct/configure nodes to compute hashes. Further still, the process can be initiated by deploying a smart contract having rules that determine when to compute the hash, the hash algorithm to be used, and any other parameters included/programmed in the smart contact. In any case, the general principle behind the operational flow depicted in FIGS. 2A and 2B is for each entity (client/proxy/server) to compute a cumulative hash over a series of packets during the audit. Each entity computes a hash for the first packet that it receives during the audit session e.g., SHA2(request), assuming the first packet is a request packet sent, for example, by the client 20. When each entity receives a second packet, each entity computes a hash of the second packet+hash of first packet, e.g., SHA2(response+SHA2(request)), assuming the second packet is a response packet to the request packet, such as a response sent by the server 30 to the request sent by the client 20. While use of a SHA2 hash (https://en.wikipedia.org/wiki/SHA-2) is referred to herein, this is meant only by way of example, and any suitable hash algorithm could be used.

At the end of audit session, each entity has access to the cumulative hash of all packets it received during the audit (by way of access to the permissioned distributed database). This way, the hashes submitted across all entities may be compared. The cumulative hash is more efficient than if each entity submitted a hash for every packet, which would result in thousands of hashes if the audit session covered thousands of packets. Comparing thousands of hashes across all entities would be impossible, or at best, very time consuming and burdensome on processing resources.

As shown at 220, the audit starts, and in one example, the client 20 sends a request to, for example, the server 30. At 222, the client computes a hash of the request packet (before it is sent), and then sends the request at 224 into the network, where it is received by the proxy 50(1). At 226, the proxy 50(1) computes a hash of the request packet it received from the client 20, and at 228 sends the request packet into the network, where it is received by proxy 50(2). At 230, proxy 50(2) computes a hash of the request packet it received from proxy 50(1), and at 232 sends the request packet on, where it is received by the server 30. At 234, the server computes a hash of the request packet it received from the proxy 50(2).

Referring to FIG. 2B, a similar process occurs in the return path, here the server 30 generates and sends a response packet. At 240, the server 30 calculates a hash of (response+hash(request)) and sends the response packet at 242, where it is received by the proxy 50(2). At 244, the proxy 50(2) computes a hash of (response+hash(request)) and sends the response packet on at 246, where it is received by the proxy 50(1). At 248, the proxy 50(1) computes a hash of (response+hash(request)) and sends the response packet on at 250, where it is received by the client 20. At 252, the client computes a hash of (response+hash(request)) and consumes the response packet. The audit then ends as indicated at 254.

At 260, each entity submits its computed hashes to the permissioned distributed database. That is, in this simple example, each entity submits two hashes, hash(request) and hash(response+hash(request)). In one embodiment, each entity submits its computed hashes to the permissioned distributed database after the audit session is complete, or it may send the hash computation results to the permissioned distributed database promptly after it is computed during the audit session.

At 270, a comparison is made across the hashes to determine if they all match each other and in so doing, to verify whether the packet payload (request and/or response) was modified in transit. For example, all of the hash(request) computation results from each entity are compared with each other and/or all of the hash(response+hash(request)) computation results are compared with each other. If any hash computation differs from the others, than the entity that submitted that anomalous hash is flagged as having been compromised. For example, if the hash(request) from proxy 50(1) does not match the hash(request) from the client 20, then proxy 50(1) is flagged as having been compromised. Moreover, in this example, since proxy 50(1) has modified the packet payload of the request, it is also most likely that the hash(request) from proxy 50(2) and from server 30 will not match that hash(request) from client 20.

When the hashes do not match, the reason could be that the server or proxy reporting the bad hash is at fault, however, the culprit could also have been the server (proxy) directly before that server (proxy) in the chain which posted the correct data, and then sent bad packets. This would appear at the following/subsequent server, which does not change the packets, posting a bad hash. A single packet trail in this case may not be sufficient to identify the offender/culprit. A system wide audit will reveal that information because it is possible to analyze patterns. For example, if an entity is determined to be a culprit, but that entity posts bad hashes always when a particular entity is upstream of the bad hashes, that points to the upstream entity as the culprit, rather than the entity posting bad hashes as the culprit.

The input to the hash computations referred to herein may include additional items, in addition to the data/payload itself. For example, in some cases the hash may be "salted" to make it more difficult to reverse engineer. The identity of the proxy may be included as part of the hash, so that for a person with the identities and the packets, they can verify the chain, but the hash will not match exactly at every hop, again which makes it more difficult for a random user to trace. In general, the hash is of the packet data and zero or more additional pieces of data.

While FIGS. 2A and 2B illustrate that the path from the server to the client may be the same as the path from the client to the server, this is not a requirement. For example, a client-server connection may set up through proxy-1 and proxy-2, and proxy-1 decides to go through proxy-3 after a period of time. Proxy-1 needs to be "aware of the application" in order to wait until the current request is served fully before setting up a path through proxy-3; otherwise the current request will not be handled completely. Proxy-1 will terminate the connection entirely so that the client can set up a new connection in which proxy-1 can then steer through Proxy-3, which can then be audited. Thus, the system may check more than one possible path to find a match before initiating the audit.

The audit may be configured to cover a certain packet flow in a variety of ways. For example, a customer availing itself of services which proxy traffic, can choose to audit:

Predetermined critical flows e.g. financial transactions; OR

Flows within a certain duration; OR

Flows to a specific set of server(s), from certain client(s) etc.

to determine if a payload is being modified in transit. To avoid bookkeeping for each and every flow, which becomes impractical to manage and process, this audit may be performed on demand and not forced on all flows.

As mentioned above, in one embodiment, the permissioned distributed database is a blockchain. A blockchain maintains a ledger of payload integrity through the transit. Each proxy in the path can add a block at the end of its operation to certify that the payload is intact and integrity is maintained. At the end of the transaction, the client, the server and/or proxies can audit all blocks in the chain to audit payload integrity across the transit.

One or more participants in a traffic flow, i.e. the client 20 and the server 30, implement these techniques, and optionally proxies implement these techniques and are provisioned to add blocks to the blockchain.

If blockchain technology is employed, a blockchain network may be created by an enterprise network leveraging a cloud service offering proxy services or the content provider leveraging the services of a DDoS mitigation provider.

Potential proxy-based services that could be in path are notified of the blockchain network and join the network. The client and server act as validating nodes, validate blocks to commit them to the distributed ledger. Proxies act as both non-validating nodes and clients who submit blocks into the blockchain. Proxies may also act as validating nodes to reject blocks submitted by other proxies but proxies will not be authorized to reject blocks added by clients and servers.

Upon a request from an enterprise network or client or a content provider, a root block is created. The root block has information on flows that are to be subjected to an audit. Flows can be described using individual parameters or a combination of parameters such as start-time/end-time, destination IP address etc. These parameters are analogous to filtering rules.

Every block in the blockchain is broadcasted to all participating nodes for consensus and updating of the distributed ledger.

Upon audit start, each participating entity adds a block at the end of the flow, or end of a critical transaction, or after exchanging packets for N minutes, or after exchanging M packets etc., based on the auditing parameters set in the root block. The block that each participating entity adds to the blockchain contains a hash for the series of packets during audit, for example, a hash computed for the first packet and then for subsequent packets, hash(current packet+hash(previous packets)) is computed, as described above.

The client 20, server 30 and proxies 50(1)-50(N) sign the blocks using their private keys and embed their certificates in the blocks. Validating nodes first check if the certificate in the block is authentic. If authenticated, the validating nodes go ahead to validate the digital signature of the transactions using the public key. If the digital signature matches, the validating nodes proceed with validating the transaction data. Using certificates will prove if the blocks for a flow are signed by the same source (for example, pursuant to Section 4.3.1 in http://hyperledger-fabric.readthedocs.io/en/stable/protocol-spec/, incorporated herein by reference).

Authenticated and authorized nodes (or proxies) are permitted to participate in the blockchain network (for example, pursuant to Section 4 in http://hyperledger-fabric.readthedocs.io/en/stable/protocol-spec/). Even if a shadow proxy in the blockchain network claims to have processed the packets, the transaction in the block will be rejected by other proxies because they would not have seen this proxy acting as a TLS proxy.

At the end of audit, the client and server can verify the entire blockchain to ensure that hashes for all payloads fully match between the client and server. If all hashes match, it is declared that the payload has remained intact throughout the flow and the blocks will be committed to the distributed ledger. If a hash does not match, the customer can determine the culprit that changed the payload or the existence of a malicious proxy in the path. Proxies can determine a malicious upstream/downstream proxy to identify the culprit proxy (for example, identify a malicious service function (SF) in the service function path).

The history of the blockchain is generally immutable, and exists all the way back to the very first transaction ever. However in this case, after a set of packets is delivered to the client and server, and are verified, then after certain a time period, all the history stored in the chain can be archived.

It can be argued that it would seem easier to set up and maintain a cloud-based service instead, i.e., the proxy servers would be required to send their hashes to the cloud server, in the same way that they would be required to send the hash to the blockchain. However, a benefit of blockchains is that they are not inherently susceptible to attacks and offer a better source of "truth" due to distributed trust across the ecosystem.

It is to be understood that not every entity that exists in a communication path needs to a part of the blockchain. That is ideal, but it is not required. For example, one proxy in the middle of the chain may not be participating. This is a so-called "dark node". In this case, the system still works, and one of two things may occur. First, the dark node does not change the packets, in which case the next server in line would receive them, hash, and post, and the audit would still confirm that the packets are ok. Second, if the dark node does some alteration to packets, then the next connected node will post a bad hash. In that case, it can be determined that either that first connected server or any of the dark nodes, or both, are bad actors. As a result, having dark nodes in the system makes it a somewhat more difficult to determine where changes occur, but overall the system still functions properly.

Figure 3:
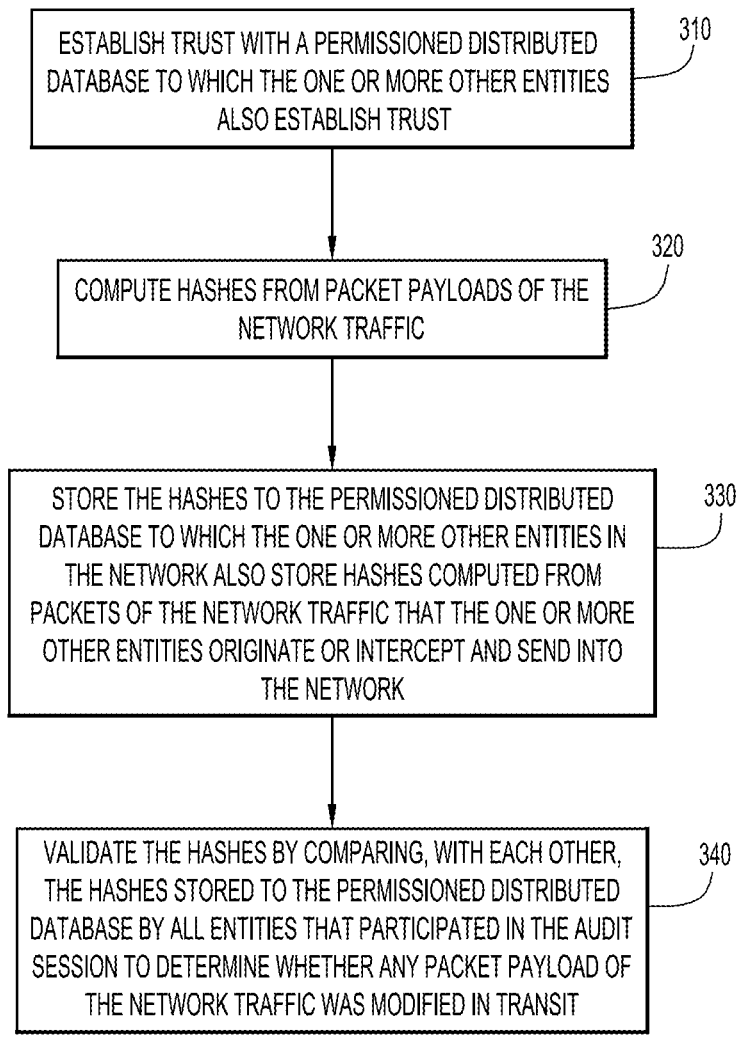
FIG. 3 is a flow chart depicting high-level operations performed by an entity participating in the payload integrity validation techniques, according to an example embodiment.

Reference is now made to FIG. 3. FIG. 3 shows a flow chart for a method 300 comprising operations performed by any given entity (client, server, proxy, etc.) that is to participate in the validation techniques described above. At 310, the entity establishes trust with a permissioned distributed database to which one or more other entities also establish trust. At 320, when an audit session is initiated by any entity (client, server, proxy, etc.), the entity computes hashes from packet payloads of the network traffic that the entity originates, intercepts or received. As explained above, a proxy entity that intercepts the network traffic may perform an operation on the network traffic and send it on into the network, to another proxy or to a client or to a server. At 330, the entity stores the hashes to the permissioned distributed database to which the one or more other entities participating in the audit session also store hashes computed from packets of the network traffic that the one or more other entities in the network originate, intercept or receive. At 340, the entity (or any of the one or more other entities) validates the hashes by comparing, with each other, the hashes stored to the permissioned distributed database by all of the entities that participated in the audit session, to determine whether any packet payload of the network traffic was modified in transit.

As an additional operation, it may further be determined which particular one of the client, server or one or more proxy entities that participated in the audit session modified the payload of one or more packets of the network traffic based on the hashes stored to the permissioned distributed database. As explained above, the hashes may be computed for: (a) packets for a particular flow of network traffic; (b) packets of network traffic associated with a transaction; (c) packets of network traffic for a predetermined time duration; or (d) for a predetermined number of packets of network packets. In one example, a cumulative hash is computed over a series of packets during the audit. The use of a cumulative hash substantially reduces the number of hashes that need to be stored and analyzed for validation.

As described above, the permissioned distributed database may be a blockchain. In that case, each entity adds to the blockchain a block including a cumulative hash computed over a series of packets during the audit. Validation is performed by comparing the cumulative hashes for each block added to the blockchain by all entities that participated in the audit session.

Figure 4:
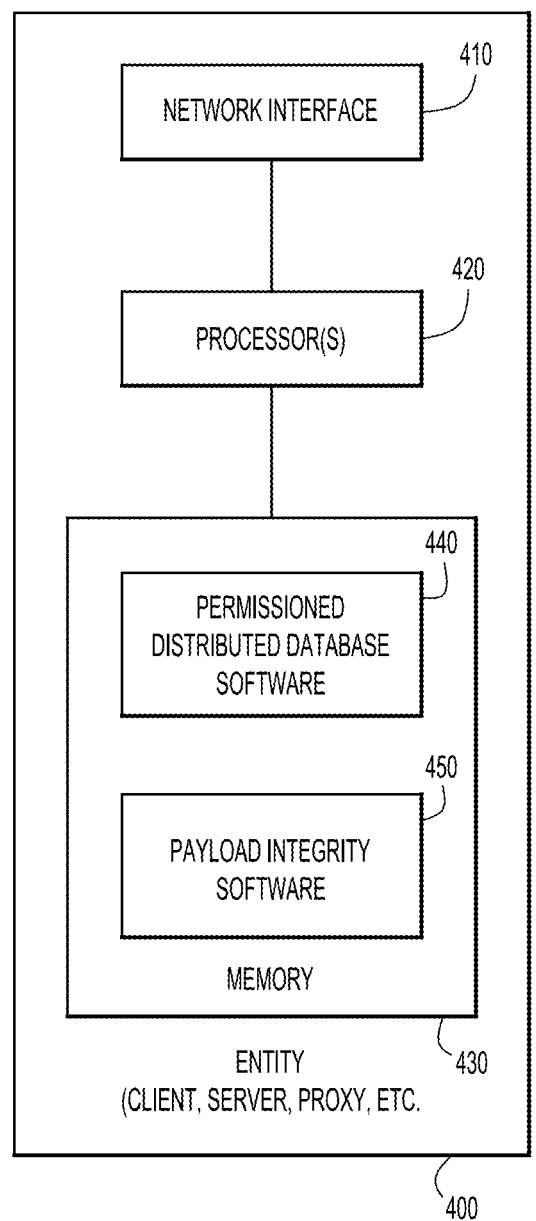
FIG. 4 is a block diagram of a device configured to participate in the payload integrity validation techniques, according to an example embodiment.

Turning to FIG. 4, a block diagram is shown of a device configured to participate as an entity in the payload integrity validation techniques described herein. The device, generally depicted at reference numeral 400, is representative of a client, server, proxy, etc. The device 400 includes a network interface 410, a processor (or multiple processors) 420, and a memory 430. The network interface 410 is configured to enable (wired and/or wireless) network communications over a network, to send packets to, and receive packets from, the network. The processor 420 may be a microprocessor or microcontroller, or multiple instances of such components. The memory 430 stores instructions for, among other functions, permissioned distributed database software 440 and payload integrity software 450. The processor 420 executes instructions stored in the memory 430 to perform a variety operations, including the operations described herein with respect to FIGS. 2A, 2B and 3. In particular, the processor 420 executes the instructions of the payload integrity software 450 to perform the operations described above in connections with FIG. 3, and executes the instructions of the permissioned distributed database software 440 to perform the various operations associated with establishing trust with, storing data to, and retrieving data from, the permissioned distributed database.

The memory 430 may be read only memory (ROM), random access memory (RAM), magnetic disk storage media devices, optical storage media devices, flash memory devices, electrical, optical, or other physical/tangible memory storage devices. Thus, in general, the memory 430 may comprise one or more tangible (non-transitory) computer readable storage media (e.g., a memory device) encoded with software comprising computer executable instructions and when the software is executed (by the processor 420) it is operable to perform the operations described herein.

In summary, the techniques presented above provide for the ability to determine payload integrity for traffic flowing across proxies using a permissioned distributed database, such as blockchain. Clients and servers can detect malicious proxies. Proxies can determine a malicious upstream/downstream proxy to identity the culprit malicious proxy. This provides a deterrent to attackers offering/running malicious proxies. This scheme uses a decentralized model that is not susceptible to compromise.

In one form, an apparatus is provided comprising: a network interface configured to send and receive packets, associated with network traffic, to and/or from one or more proxy entities in a network; and a processor coupled to the network interface, wherein the processor is configured to: establish trust with a permissioned distributed database to which the one or more proxy entities establish trust; when an audit session is initiated, compute hashes from packet payloads of the network traffic originated by the apparatus and sent into the network via the network interface or from packet payloads of network traffic received from the network by the network interface; store the hashes to the permissioned distributed database to which the one or more proxy entities in the network also store hashes computed from packets of the network traffic intercepted by one or more proxy entities in the network; and validate the hashes by comparing, with each other, the hashes stored to the permissioned distributed database by the apparatus and by the one or more proxy entities that participated in the audit session to determine whether any packet payload of the network traffic was modified in transit.

In another form, a computer-implemented method is provided for operation in a network that includes a client, a server and one or more proxy entities that intercept network traffic between the client and the server, the method comprising: establishing trust with a permissioned distributed database; when an audit session is initiated, computing hashes from packet payloads of network traffic originated, intercepted or received by the client, server and the one or more proxy entities; storing the hashes to the permissioned distributed database so that the permissioned distributed database maintains hashes computed from packets of the network traffic originated, intercepted or received by the client, server and the one or more proxy entities; and validating the hashes by comparing, with each other, the hashes stored to the permissioned distributed database by the client, server and the one or more proxy entities to determine whether any packet payload of the network traffic was modified in transit.

In still another form, one or more non-transitory computer readable storage media encoded with instructions that, when executed by a processor, cause the processor to: establish trust with a permissioned distributed database; when an audit session is initiated, compute hashes from packet payloads of received network traffic; store the hashes to the permissioned distributed database so that the permissioned distributed database maintains hashes computed from packets of the network traffic originated, intercepted or received by a client, a server and one or more other proxy entities that intercept network traffic between the client and the server; and validate the hashes by comparing, with each other, the hashes stored to the permissioned distributed database by the client, server and the one or more proxy entities to determine whether any packet payload of the network traffic was modified in transit.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   a network interface configured to send and receive packets, associated with network traffic, to and/or from one or more proxy entities in a network; and
   a processor coupled to the network interface, wherein the processor is configured to:
   establish trust with a permissioned distributed database to which the one or more proxy entities establish trust;
   when an audit session is initiated, compute hashes from packet payloads of network traffic originated by the apparatus and sent into the network via the network interface or from packet payloads of network traffic received from the network by the network interface;
   store the hashes to the permissioned distributed database to which the one or more proxy entities in the network also store hashes computed from packet payloads of the network traffic intercepted by one or more proxy entities in the network;
   validate the hashes by comparing, with each other, the hashes stored to the permissioned distributed database by the apparatus and by the one or more proxy entities that participated in the audit session to determine whether any packet payload of the network traffic was modified in transit; and
   in response to a determination that one or more packet payloads of the network traffic was modified in transit, determine, based on the hashes stored to the permissioned distributed database, a particular entity that modified the one or more packet payloads of the network traffic.

2. The apparatus of claim 1, wherein the processor is configured to compute the hashes for: packets for a particular flow of network traffic; packets of network traffic associated with a transaction; packets of network traffic for a predetermined time duration; or for a predetermined number of packets of network packets.

3. The apparatus of claim 2, wherein the processor is configured to compute a cumulative hash over a series of packets.

4. The apparatus of claim 3, wherein the processor is configured to compute the cumulative hash by computing a hash for a first packet and then computes for subsequent packets, hash(current packet+hash(previous packets)).

5. The apparatus of claim 1, wherein the permissioned distributed database is a blockchain, and the processor is configured to add to the blockchain a block including a cumulative hash computed over a series of packets.

6. The apparatus of claim 5, wherein the processor is configured to validate by comparing with each other the cumulative hashes for each block added to the blockchain for the audit session.

7. The apparatus of claim 1, wherein the processor is configured to request that the audit session is initiated.

8. In a network that includes a client, a server and one or more proxy entities that intercept network traffic between the client and the server, a computer-implemented method comprising:
   establishing trust with a permissioned distributed database;
   when an audit session is initiated, computing hashes from packet payloads of network traffic originated, intercepted or received by the client, the server and the one or more proxy entities;
   storing the hashes to the permissioned distributed database so that the permissioned distributed database maintains hashes computed from packet payloads of the network traffic originated, intercepted or received by the client, the server and the one or more proxy entities;
   validating the hashes by comparing, with each other, the hashes stored to the permissioned distributed database by the client, server and the one or more proxy entities to determine whether any packet payload of the network traffic was modified in transit; and
   in response to a determination that one or more packet payloads of the network traffic was modified in transit, determining, based on the hashes stored to the permissioned distributed database, a particular entity that modified the one or more packet payloads of the network traffic.

9. The method of claim 8, wherein computing hashes comprises computing hashes for: packets for a particular flow of network traffic; packets of network traffic associated with a transaction; packets of network traffic for a predetermined time duration; or for a predetermined number of packets of network packets.

10. The method of claim 9, wherein computing hashes comprises computing a cumulative hash over a series of packets.

11. The method of claim 10, wherein computing the cumulative hash comprises computing a hash for a first packet and then computes for subsequent packets, hash (current packet+hash(previous packets)).

12. The method of claim 8, wherein the permissioned distributed database is a blockchain, and further comprising adding to the blockchain a block including a cumulative hash computed over a series of packets.

13. The method of claim 12, wherein validating comprises comparing with each other the cumulative hashes for each block added by the client, server and the one or more proxy entities to the blockchain for the audit session.

14. The method of claim 8, further comprising requesting that the audit session is initiated.

15. One or more non-transitory computer readable storage media encoded with instructions that, when executed by a processor, cause the processor to:
establish trust with a permissioned distributed database;
when an audit session is initiated, compute hashes from packet payloads of received network traffic;
store the hashes to the permissioned distributed database so that the permissioned distributed database maintains hashes computed from packet payloads of the network traffic originated, intercepted or received by a client, a server and one or more proxy entities that intercept network traffic between the client and the server;
validate the hashes by comparing, with each other, the hashes stored to the permissioned distributed database by the client, the server and the one or more proxy entities to determine whether any packet payload of the network traffic was modified in transit; and
in response to a determination that one or more packet payloads of the network traffic was modified in transit, determine, based on the hashes stored to the permissioned distributed database, a particular entity that modified the one or more packet payloads of the network traffic.

16. The non-transitory computer readable storage media of claim 15, wherein the instructions that cause the processor to compute hashes comprise instructions that cause the processor to compute hashes for: packets for a particular flow of network traffic; packets of network traffic associated with a transaction; packets of network traffic for a predetermined time duration; or for a predetermined number of packets of network packets.

17. The non-transitory computer readable storage media of claim 16, wherein the instructions that cause the processor to compute hashes comprise instructions that cause the processor to compute a cumulative hash over a series of packets.

18. The non-transitory computer readable storage media of claim 15, wherein the permissioned distributed database is a blockchain, and further comprising instructions that cause the processor to add to the blockchain a block including a cumulative hash computed over a series of packets.

19. The non-transitory computer readable storage media of claim 18, wherein the instructions that cause the processor to validate include instructions that cause the processor to compare with each other the cumulative hashes for each block added by the client, server and the one or more proxy entities to the blockchain.

20. The non-transitory computer readable storage media of claim 17, wherein the instructions that cause the processor to compute the cumulative hash comprise instructions that cause the processor to compute a hash for a first packet and then compute for subsequent packets, hash(current packet+hash(previous packets)).

* * * * *